United States Patent [19]

Leach et al.

[11] 4,007,130
[45] Feb. 8, 1977

[54] CATALYST REGENERATION METHOD

[75] Inventors: Harry S. Leach; Thomas C. Singleton, both of Texas City; Yu Wen Wei, Houston, all of Tex.

[73] Assignee: Monsanto Company, St. Louis, Mo.

[22] Filed: Dec. 29, 1975

[21] Appl. No.: 644,390

[52] U.S. Cl. .......................... 252/411 R; 252/413; 252/414; 260/488 K
[51] Int. Cl.² ........................................ B01J 23/96
[58] Field of Search .............. 252/411 R, 413, 414; 260/488 K

[56] References Cited

UNITED STATES PATENTS

| | | | |
|---|---|---|---|
| 3,192,151 | 6/1965 | Connor et al. | 252/411 R |
| 3,197,416 | 7/1965 | Bergman et al. | 252/413 |
| 3,887,489 | 6/1975 | Fannin et al. | 252/413 |

*Primary Examiner*—W. J. Shine
*Attorney, Agent, or Firm*—Elizabeth F. Sporar

[57] ABSTRACT

A method for treating catalyst solution comprising the complex reaction product formed on mixing of a rhodium component or an iridium component and a halogen component in the presence of carbon monoxide to remove metallic corrosion products and recover rhodium or iridium and halogen values therefrom.

9 Claims, No Drawings

CATALYST REGENERATION METHOD

BACKGROUND OF THE INVENTION

The present invention relates to an improvement in the process for production of carboxylic acids, esters and anhydrides by carbonylation in the presence of catalyst complex systems comprising a rhodium-containing or an iridium-containing component and a halogen component. More particularly, it relates to a method for regenerating the metal catalyst complex employed in such processes.

A process has recently been developed for the preparation of carboxylic acids, esters and anhydrides by the reaction of olefins, alcohols or esters, or ethers and halide derivatives thereof, with carbon monoxide in contact with catalyst systems formed on mixing of a rhodium component or an iridium component and a halogen component in the presence of carbon monoxide. This process is described, for example, in U.S. Pat. Nos. 3,579,551, 3,579,552, 3,769,329 and 3,772,380. A hydrogen halide or an alkyl halide, notably hydrogen iodide or methyl iodide, is usually employed as the halogen component in these catalyst systems. The catalyst itself is self-regenerative. In operation of the process on a continuous basis, a solution containing the soluble catalyst complex is separated from the reactor effluent and recycled to the reactor. However, with operation over extended periods of time, corrosion products, namely, iodides of iron, nickel, molybdenum, chromium and the like form and build up in this catalyst recycle stream. Such foreign metals, if present in sufficient quantity, are known to interfere with the carbonylation reaction or accelerate competing reactions such as the water-gas reaction (carbon dioxide and hydrogen formation) and alkane formation. These have an adverse effect on the process in that they cause a decrease in the partial pressure of carbon monoxide in the reactor resulting in loss in yield based on carbon monoxide. Further, foreign metals present can react with ionic iodine thus making this component of the catalytic system unavailable for reaction with rhodium or iridium, causing instability in the catalyst system. In view of the high cost of the rhodium- or iridium-containing catalyst complex, replacement of spent catalyst complex can be effected only at a prohibitive cost. Consequently, a method for regeneration of the catalyst complex is not only desirable but necessary. It is an object of the present invention, therefore, to provide a method for treating spent catalyst solution to remove metallic corrosion products therefrom and to recover the valuable rhodium metal or iridium metal component in a form suitable for return to the process as active catalyst complex.

SUMMARY OF THE INVENTION

According to the process of the present invention, a catalyst solution comprising the complex reaction product of a rhodium component or an iridium component, a halogen component and carbon monoxide which contains metallic corrosion products is intimately contacted with a cation exchange resin in its hydrogen form and the catalyst solution is recovered free of said metallic corrosion products. Generally, the contacting is effected by passing the catalyst solution containing the undesirable corrosion metal contaminants through a bed of the cation exchange resin and recovering as the effluent from the bed the catalyst solution containing the complex rhodium or iridium component but substantially freed of the corrosion products which are adsorbed on the resin bed. Upon exhaustion as indicated by breakthrough of the corrosion metal products in the effluent, the resin bed can be regenerated by treatment with a mineral acid such as hydrochloric, sulfuric, phosphoric or hydriodic acid and re-used.

DESCRIPTION OF THE PREFERRED EMBODIMENTS

The process of the present invention is applicable to regeneration of any catalyst solutions containing soluble rhodium or iridium complexes and metallic corrosion products such as the iodides of iron, nickel, chromium and molybdenum. Catalyst solutions to which the regeneration technique of the invention is particularly applicable are those formed upon mixing of a rhodium or iridium component and an iodine component in the presence of carbon monoxide. As indicated previously such catalysts are employed for the preparation of carboxylic acids, esters and anhydrides by the reaction of alcohols or esters, or ether or halide derivatives thereof, or olefins with carbon monoxide. Such catalysts are also utilized for the preparation of hydrogen iodide by the reaction of iodine with water and carbon monoxide and of alkyl iodides by further reaction of the reaction mixture containing hydrogen iodide with an alcohol and in other reactions. They can occur by in situ formation in a reactor for the production of acetic acid, propionic acid, methyl acetate, acetic anhydride, hydrogen iodide and other compounds or they can be prepared externally of the reactor if desired and charged as such to it. The rhodium or iridium component used in preparing the catalyst may be either the rhodium or iridium metal itself or compounds of these metals such as salts, oxides, complexes or coordination compounds. The terms "complex" and "coordination compound" as employed herein mean a compound or complex formed by combination of one or more electronically-rich molecules or atoms capable of independent existence with one or more electronically-poor molecules or atoms, each of which may also be capable of independent existence. Among the large number of suitable rhodium and iridium components are, for example, those mentioned in the following list which, however, is by no means considered to be a limiting one with respect to the rhodium or iridium component for the catalyst.

| | | | |
|---|---|---|---|
| $RhCl_3.H_2O$ | $Rh_2O_3.5H_2O$ | $IrCl_3$ | $Ir_2O_3$ |
| $RhBr_3$ | $Rh_2(CO)_4Cl_2$ | $IrBr_3$ | $Ir(CO)_2Cl_2$ |
| $RhI_3$ | $Rh_2(CO)_4Br_2$ | $IrI_3$ | $Ir(CO)_2I_2$ |
| $Rh(NO_3)_3.2H_2O$ | $Rh_2(CO)_4I_2$ | $IrCl_3.4H_2O$ | $Ir(NO_3)_3$ |
| $Rh_2O_3$ | $Rh_4(CO)_{12}$ | $IrO_2$ | $Ir(CO)_2Br_2$ |

The iodine-containing component of the catalyst is preferably HI, but it may be iodine itself or any iodine-containing compound such as alkyl iodides, for example, methyl iodide, ethyl iodide, and the like, aryl iodides such as phenyl iodide, or iodine salts, for example, sodium or potassium iodide, and ammonium iodide. Generally, the catalyst solution contains in addition to the soluble rhodium or iridium component, water, hydrogen iodide, methyl iodide and some of the carbonylation product which can be a monocarboxylic acid such as acetic acid, propionic acid, and the like, esters of such acids such as methyl acetate, ethyl propionate and the like and anhydrides of such acids such as acetic anhydride, propionic anhydride and the like.

The resins useful for regenerating the spent catalyst solution according to the present invention are cation exchange resins either of the strong-acid or the weak-acid type in their hydrogen form. Both types are readily available as commercial products. The weak-acid cation exchange resins are mostly copolymers of acrylic or methacrylic acids or esters or the corresponding nitriles but a few of those marketed are phenolic resins. Strong-acid cation exchange resins which are the resins preferred for use in the present invention are constituted predominantly of sulfonated styrenedivinylbenzene copolymers although some of the available resins of this type are phenol-formaldehyde condensation polymers. Either the gel type or the macroreticular type resin is suitable but the latter is preferred since organic components are present in the catalyst solution being treated.

Contacting of the spent catalyst solution and the resin can be effected in a stirred vessel wherein the resin is slurried with the catalyst solution with good agitation and the catalyst solution is then recovered by decantation, filtration, centrifuging, etc. However, treatment of the spent catalyst solution is usually effected by passing it through a fixed-bed column of the resin. The catalyst regeneration can be carried out as a batch, semi-continuous or continuous operation either with manual or automatic control employing methods and techniques well known in the art of ion-exchange.

The ion exchange treatment can be effected at temperatures in the range from about 0° to about 120° C, although lower or higher temperatures limited only by the stability of the resin can be employed. Preferred temperatures are those in the range from about 20° to about 90° C since chromium removal is more efficient at the higher temperatures. At the higher temperatures, a nitrogen or CO purge is desirable. If temperatures above the boiling point of the catalyst solution are employed, then operation under pressure will be required to maintain the solution in the liquid phase. However, pressure is not a critical variable. Generally, atmospheric pressure or a pressure slightly above atmospheric is employed but superatmospheric or subatmospheric pressures can be used if desired.

The rate of flow of the catalyst solution through the resin will, in general, be that recommended by the resin manufacturer and will usually be from about 1 to about 20 bed volumes per hour. Preferably, the flow rates are kept to from about 2 to about 12 bed volumes per hour. After contacting, washing or rinsing of the resin bed with water or the carbonylation product from the process from which the catalyst being treated is derived such as acetic acid, propionic acid, acetic anhydride, propionic anhydride, etc., is essential for removing all the rhodium or iridium from the resin bed. The rinsing or washing is effected at the same flow rates as the ion exchange step.

After it has become exhausted, i.e., when the metal corrosion products are breaking through into the effluent, the resin can be regenerated by passing through it a solution of a mineral acid such as sulfuric, hydrochloric, phosphoric, hydriodic, and the like. Generally, the acid used in the acid-treating cycle has a concentration in the range from about 10% to about 50%. Quantities employed and procedures are those well established in the art and recommended by the resin manufacturers.

Aqueous hydrogen iodide is preferred as a regenerating agent since this acid is normally employed in the reaction system and is readily available for use. Additionally, it has the advantage that its use precludes any contamination of the catalyst solution which after the ion exchange treatment is recycled to the reactor. A still further advantage is that its use eliminates the rinsing step normally required after the regeneration process when other acid regenerants are employed. Solutions of aqueous hydrogen iodide ranging from about 10% to about 57% can be used but those containing about 20% are preferred.

The treatment of the catalyst solution can be operated as a batch or a continuous operation. The preferred type of operation is a continuous one wherein a slipstream from a catalyst solution being recycled to the reactor for producing acids, esters or anhydrides is withdrawn, passed through the ion-exchange resin, the corrosion products being adsorbed thereon, and the effluent free of said corrosion products is returned to the catalyst recycle stream and thence to the reactor. The ion-exchange operation can be cyclic. As the resin becomes exhausted in one bed, the slipstream of catalyst solution can be diverted to a fresh bed while the exhausted bed is subjected to regeneration.

The invention is illustrated in the following examples which, however, are not to be construed as limiting it in any manner except as it is limited in the appended claims.

EXAMPLE 1

A series of tests were made in which the regeneration of samples of spent catalyst solutions was carried out using in their hydrogen form two strong-acid cation exchange resins of the sulfonated styrene-divinylbenzene copolymer type known to the trade as "Amberlyst-15" and "Amberlite IR-120," resins manufactured by the Rohm and Haas Company. The catalyst solutions treated contained soluble rhodium iodocarbonyl complex, hydrogen iodide, water, acetic acid and metal-containing corrosion products in varying proportions. These samples were obtained from a reactor constructed of a nickel alloy in which acetic acid was produced continuously by reacting carbon monoxide with methanol in contact with a catalyst complex obtained by reacting a rhodium triiodide, hydrogen iodide and carbon monoxide. Some of the samples were taken directly from the reactor while others were samples of the recycle catalyst stream, i.e., the reactor stream after it had been subjected to an adiabatic flash to remove most of the carbonylation products therefrom as vapors. Both streams contained the same constituents but in different proportions.

A column 2.54 cm in inside diameter and approximately 25.4 cm long was charged with 100 cc of the resin which was supported on a packing of glass wool at the bottom. The resin was treated prior to use with 10% $H_2O$-acetic acid mixture for approximately 12 hours until it had swelled approximately 50%. Thereafter it was backwashed to remove fines and rinsed with 5 bed volumes of acetic acid.

The catalyst solution was passed through the resin maintained at ambient temperature (27° C) and atmospheric pressure at a rate of about two bed volumes per hour and the effluent was collected in a receiver at the bottom of the column. After all the solution had passed through the resin, the resin bed was washed or rinsed with water and these washings were added to the original effluent. Analyses of both the catalyst solution being treated and the total column effluent were made for iron, nickel, chromium and molybdenum. In some runs, the resin employed was that used in a previous run and regenerated by passing a 10% solution of an acid through the resin at about one-half the flow rate employed for treating the catalyst solution and following with an acetic acid wash. The results obtained under the various conditions employed are presented in Table 1. These data show that the metal corrosion products can be effectively removed from a rhodium-containing catalyst solution with essentially no loss of rhodium occurring.

EXAMPLE 2

A spent catalyst solution from the same source as that treated in Example 1 and containing the same constituents was passed through a column about 52 cm long and 1.9 cm in inside diameter packed with a weak-acid cation exchange resin known to the trade as "Amberlite IRC-50" manufactured by Rohm and Haas, Company. Flow rate through the resin bed was approximately 4.7 cc per minute and the effluent was collected in receivers at the bottom of the column. Collection of the first fraction (144.0 grams) was begun just prior to observation of catalyst breakthrough; a heart cut or fraction (227.4 grams) was then collected; after all the catalyst solution had been charged, a 10% water-acetic acid mixture was passed through the resin bed and the effluent therefrom was collected as a third fraction. The influent catalyst solution and the three fractions were all analyzed by atomic absorption for determination of their metal content. Results are presented in Table 2 below which show removal of some of the contaminating materials, iron, nickel, and molybdenum.

TABLE 2

|  | Metals Content (ppm) | | | | |
|---|---|---|---|---|---|
|  | Rh | Fe | Ni | Cr | Mo |
| Spent Catalyst Solution | 485 | 1806 | 2414 | 978 | 508 |
| Fraction 1 | 378 | 1220 | 1451 | 857 | 197 |
| Fraction 2 | 460 | 1097 | 1559 | 972 | 263 |
| Fraction 3 | 259 | 422 | 707 | 196 | 76 |

EXAMPLE 3

Two extended runs were made in which 3500-g batches of a catalyst solution similar to those described in Example 1 containing soluble rhodium iodocarbonyl complex, hydrogen iodide, water, acetic acid and metal-containing corrosion products were treated with a strong-acid cation exchange resin for removal of the metal-containing corrosion products. The resin, Amberlyst-15, the same strong-acid cation exchange resin used in Example 1, was employed in Run No. 1 in its fresh state as received from the manufacturer and in Run No. 2 in its regenerated state, having been regenerated by treating with 20% HI after exhaustion. Both runs were made at ambient temperature (~24° to 26° C) and atmospheric pressure using a fixed bed column 2.54 cm in inside diameter and 61 cm long containing 300 cc of resin (bed volume 280 cc). As in Example 1, the resin was treated prior to use with a 10% $H_2O$-acetic mixture for a 12-hour period to provide a swelling of about 50%, backwashed to remove fines and then rinsed with about five bed volumes of acetic acid. Flow rates were 1.4 bed volumes per hour for Run No. 1 and 4 bed volumes per hour for Run No. 2. Samples of the original catalyst solutions and the effluents after passage of a given number of bed volumes (B.V.) of catalyst solution through the bed were analyzed by atomic absorption for iron, nickel, chromium and molybdenum. Results of these analyses presented in Table 3 below show highly effective removal of metal corrosion products from the catalyst solution by this treatment with excellent recovery of the rhodium being achieved.

EXAMPLE 4

A sample of spent catalyst solution was obtained from a laboratory bench-scale unit wherein propionic acid was prepared by the reaction of ethylene, CO and water in the presence of a catalyst comprising the reaction product of rhodium triiodide, ethyl iodide and CO. Metals employed in the fabrication of the reaction and purification systems and accessory parts thereof included zirconium, Hastelloy B and stainless steel. The catalyst solution contained a soluble rhodium iodocarbonyl complex, hydrogen iodide, water, propionic acid and metal-containing corrosion products. The solution was regenerated by treating with a cation exchange

TABLE 1

| Run Number | Resin | CATALYST SOLUTION | | | | | | EFFLUENT | | | | | Temp °C | Regenerant |
|---|---|---|---|---|---|---|---|---|---|---|---|---|---|---|
|  |  | Source | Analysis, (ppm) | | | | | & Analysis, (ppm) | | | | |  |  |
|  |  |  | Rh | Fe | Ni | Cr | Mo | Rh | Fe | Ni | Cr | Mo |  |  |
| 1 | Amberlyst-15 Fresh | R | 307 | 1407 | 1762 | 684 | 598 | 309 | 2 | 2 | 621 | 182 | 25–27 |  |
| 2 | Amberlyst-15 Regenerated from 1 | R | 307 | 1407 | 1762 | 684 | 598 | 302 | <1 | 2 | 557 | 50 | 25–27 | 10% HCl |
| 3 | Amberlyst-15 Regenerated from 2 | R' | 349 | 1058 | 1374 | 496 | 246 | 351 | 9 | 2 | 379 | 67 | 25–27 | 10% $H_2SO_4$ |
| 4 | Amberlite IR-120 Fresh | R' | 349 | 1058 | 1374 | 496 | 246 | 350 | 15 | 17 | 497 | 240 | 25–27 |  |
| 5 | Amberlyst-15 Regenerated from 3 | R' | 349 | 1058 | 1374 | 496 | 246 | 351 | 6 | 10 | 224 | 21 | 25–27 | 10% HI |
| 6 | Amberlyst-15 Fresh | R' | 446 | 2106 | 2445 | 960 | 423 | 375 | 2 | 1 | 122 | 53 | 60–80 | ** |
| 7 | Amberlyst-15 Regenerated from 6 | R' | 446 | 2106 | 2445 | 960 | 423 | 469 | 1 | 1 | 740 | 41 | 45–55 | 10% $H_2SO_4$ |
| 8 | Amberlyst-15 Fresh | R' | 370 | 2459 | 2365 | 928 | 313 | 394 | 5 | 6 | 233 | 84 | 85–95 | * |

**without $N_2$ purge
*with $N_2$ purge
R=Reactor
R'=Recycle resin for removal of the metal-containing corrosion products.

TABLE 3

| SAMPLE | | Metals Content, (ppm) | | | | |
|---|---|---|---|---|---|---|
| | | Rh | Fe | Ni | Cr | Mo |
| Run No. 1 | | | | | | |
| Catalyst Solution | | 420 | 1680 | 2261 | 602 | 382 |
| Effluent | | | | | | |
| No. | B. V. | | | | | |
| 1 | 1.3 | 252 | 3.5 | 17 | 304 | 27 |
| 2 | 2 | 403 | 2.4 | 9 | 669 | 43 |
| 3 | 2.6 | 387 | 2.4 | 9 | 628 | 57 |
| 4 | 3.3 | 399 | 3.6 | 0.5 | 699 | 65 |
| 5 | 4.3 | 401 | 1.2 | 5 | 688 | 204 |
| Run No. 2 | | | | | | |
| Catalyst Solution | | 414 | 2265 | 2229 | 1010 | 1200 |
| Effluent | | | | | | |
| No. | B. V. | | | | | |
| 1 | 1 | 328 | 31 | 80 | 738 | 263 |
| 2 | 2 | 409 | 37 | 34 | 932 | 494 |
| 3 | 4 | 393 | 67 | 93 | 945 | 929 |
| 4 | 6 | 388 | 560 | 900 | 998 | 1098 |
| 5 | 8 | 412 | 1083 | 1505 | 1035 | 1087 |
| 6 | 10 | 399 | 1280 | 1770 | 1002 | 1154 |

Approximately 300 cc of Amberlyst-15, the strong-acid cation exchange resin used in Examples 1 and 3, was allowed to stand in a mixture of 10% water in propionic acid for one hour to permit maximum swelling of the resin. The resulting resin slurry was transferred to a Pyrex column about 102 cm long and 2.54 cm in inside diameter fitted at the bottom with a glass wool filter. The resin was backwashed by passing a 10% water in propionic acid solution upward through the column at a rate to fluidize the resin particles. The liquid flow was discontinued and the resin particles allowed to settle. After settling, the liquid was withdrawn from the top of the column. The backwashing operation was repeated three times to insure the proper gradient of particle size throughout the column. After the final settling step, the top portion of the resin was withdrawn by vacuum transfer to leave a resin bed about 61 cm high.

The spent catalyst solution was passed through the resin bed at a linear velocity of 0.9 cm/min and the effluent was collected in a receiver at the bottom of the column. After all the solution had passed through, the column was eluted with a 10% $H_2O$-propionic acid mixture and these washings were combined with the previously collected effluent. The spent catalyst solution and a heart cut of the effluent obtained as described in Example 2 were analyzed by atomic absorption for metals content. Results are presented in Table 4 below from which it can be seen that the ion-exchange treatment resulted in effective removal of the contaminating metals and that recovery of rhodium in the solution was excellent.

TABLE 4

| | Metals Content, (ppm) | | | |
|---|---|---|---|---|
| | Rh | Fe | Ni | Cr |
| Spent Catalyst Solution | 153 | 930 | 1660 | 560 |
| Effluent | 162 | 2 | 0 | 200 |

What is claimed is:
1. A process for the regeneration of a spent catalyst solution comprising the complex reaction product formed from a rhodium or iridium component, an iodine component and carbon monoxide and containing metallic corrosion products which comprises intimately contacting said spent catalyst solution with a cation exchange resin in its hydrogen form and recovering said catalyst solution free of said metallic corrosion products.
2. The process of claim 1 wherein said complex reaction product is formed from a rhodium component, an iodine component and carbon monoxide.
3. The process of claim 2 wherein said resin is a strong-acid cation exchange resin.
4. The process of claim 3 wherein said contacting is effected at a temperature from about 0° to about 120° C.
5. The process of claim 4 wherein said contacting is effected by passing the spent catalyst solution through a fixed-bed column of said resin.
6. The process of claim 5 wherein the rate of flow of said catalyst solution through said resin bed is from about one to about 20 bed volumes per hour.
7. The process of claim 6 wherein said resin has been regenerated after exhaustion by washing with a mineral acid.
8. The process of claim 7 wherein said acid is hydriodic acid.
9. The process of claim 8 wherein the concentration of hydriodic acid is about 20%.

* * * * *